US012366252B1

(12) United States Patent
Hsieh et al.

(10) Patent No.: US 12,366,252 B1
(45) Date of Patent: Jul. 22, 2025

(54) CEILING FAN BLADE QUICK ASSEMBLY STRUCTURE

(71) Applicant: HOTECK INC., Taichung (TW)

(72) Inventors: Lung-Fa Hsieh, Taichung (TW);
Yu-Chen Hsieh, Taichung (TW);
Min-Yuan Hsiao, Taichung (TW);
Ying-Pin Chiang, Taichung (TW)

(73) Assignee: HOTECK INC., Taichung (TW)

( * ) Notice: Subject to any disclaimer, the term of this patent is extended or adjusted under 35 U.S.C. 154(b) by 0 days.

(21) Appl. No.: 18/895,414

(22) Filed: Sep. 25, 2024

(30) Foreign Application Priority Data

Jul. 18, 2024 (TW) .................................. 113207710

(51) Int. Cl.
*F04D 29/34* (2006.01)
*F04D 25/08* (2006.01)
(Continued)

(52) U.S. Cl.
CPC ........... *F04D 29/34* (2013.01); *F04D 25/088* (2013.01); *F16B 5/0012* (2013.01);
(Continued)

(58) Field of Classification Search
CPC ........ F04D 25/088; F04D 29/34; F04D 29/36; F16B 5/0012; F16B 5/0016; F16B 5/0024;
(Continued)

(56) References Cited

U.S. PATENT DOCUMENTS 5,102,253 A * 4/1992 Pugliesi-Conti ...... F16B 5/0016
403/31
5,980,353 A * 11/1999 Wu ....................... F04D 25/088
416/207
(Continued)

FOREIGN PATENT DOCUMENTS

CA           3020741 A1 *  4/2020
CN         106351930 A  *  1/2017
(Continued)

OTHER PUBLICATIONS

English machine translation of CN-212928307-U, Mar. 13, 2025.*
English machine translation of CN-111852920-A, Mar. 13, 2025.*
English machine translation of CN-106351930-A, Mar. 13, 2025.*

*Primary Examiner* — Christopher Verdier
(74) *Attorney, Agent, or Firm* — Li & Cai Intellectual Property Office

(57) ABSTRACT

A ceiling fan blade quick assembly structure includes a blade frame, fan blades, and tenon assemblies. The blade frame includes mounting portions. Each of the mounting portions includes a bottom plate, a top plate, and a lateral slot. An insertion hole is formed on the top plate. A buckle hole is formed on the bottom plate. Each of the fan blades has a blade body and an assembly portion. The assembly portion has a positioning groove and a first elastic buckle. A second elastic buckle is disposed on one side of each of the tenon assemblies. The assembly portions of the fan blades are respectively inserted into the lateral slots of the plurality of mounting portions of the blade frame, the first elastic
(Continued)

buckles are respectively buckled with the buckle holes, and the tenon assemblies are respectively inserted into the corresponding insertion holes and the positioning grooves.

7 Claims, 8 Drawing Sheets

(51) Int. Cl.
*F16B 5/00* (2006.01)
*F16B 21/06* (2006.01)
*F16B 21/08* (2006.01)
*F16B 21/12* (2006.01)

(52) U.S. Cl.
CPC .......... *F16B 5/0016* (2013.01); *F16B 5/0024* (2013.01); *F16B 21/06* (2013.01); *F16B 21/065* (2013.01); *F16B 21/08* (2013.01); *F16B 21/086* (2013.01); *F16B 21/12* (2013.01); *F16B 21/125* (2013.01)

(58) Field of Classification Search
CPC ........ F16B 21/06; F16B 21/065; F16B 21/08; F16B 21/086; F16B 21/12; F16B 21/125
See application file for complete search history.

(56) References Cited

U.S. PATENT DOCUMENTS

| | | | | |
|---|---|---|---|---|
| 6,059,531 | A | * | 5/2000 | Tai .......................... F04D 29/34 416/207 |
| 6,378,824 | B1 | * | 4/2002 | Tseng ...................... F04D 29/34 248/220.21 |
| 7,008,192 | B2 | * | 3/2006 | Hidalgo .................. F04D 29/34 416/220 A |
| 12,000,407 | B1 | * | 6/2024 | Hsieh ...................... F04D 29/34 |
| 12,203,478 | B1 | * | 1/2025 | Guo ........................ F04D 29/34 |
| 2016/0236592 | A1 | * | 8/2016 | Peniche ................... F16B 2/22 |
| 2020/0340515 | A1 | * | 10/2020 | Ulsamer ............... F16B 5/0621 |
| 2024/0141916 | A1 | * | 5/2024 | Huang .................. F04D 25/088 |
| 2024/0426309 | A1 | * | 12/2024 | Huang .................. F04D 25/088 |

FOREIGN PATENT DOCUMENTS

| | | | |
|---|---|---|---|
| CN | 111852920 | A * | 10/2020 |
| CN | 212928307 | U * | 4/2021 |

* cited by examiner

CEILING FAN BLADE QUICK ASSEMBLY STRUCTURE

CROSS-REFERENCE TO RELATED PATENT APPLICATION

This application claims the benefit of priority to Taiwan Patent Application No. 113207710, filed on Jul. 18, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a ceiling fan device, and more particularly to a ceiling fan blade quick assembly structure that enables a quick completion of blade assembly.

BACKGROUND OF THE DISCLOSURE

An existing ceiling fan includes a base, a motor arranged on the base, a blade frame connected to the motor, and a plurality of fan blades locked on the blade frame. When the existing ceiling fan is assembled, tools are required for locking the fan blades to a main body of the ceiling fan, and then the main body is hung from the ceiling; alternatively, the blades are installed to the main body at height. However, the ceiling fan is bulky and installation is difficult to operate at height, such that assembly is labor-intensive and time-consuming.

SUMMARY OF THE DISCLOSURE

In response to the above-referenced technical inadequacies, the present disclosure provides a ceiling fan blade quick assembly structure that enables hanging a main body first and then quickly assembling fan blades without the use of tools.

In order to solve the above-mentioned problems, one of the technical aspects adopted by the present disclosure is to provide a ceiling fan blade quick assembly structure. The ceiling fan blade quick assembly structure includes a blade frame, a plurality of fan blades, and a plurality of tenon assemblies. The blade frame includes a plurality of mounting portions. Each of the plurality of mounting portions includes a bottom plate, a top plate, and a lateral slot, the top plate is arranged at an interval above the bottom plate, and the lateral slot is located between the bottom plate and the top plate. An insertion hole is formed on the top plate, and the insertion hole penetrates two sides of the top plate. A buckle hole is formed on the bottom plate, and the buckle hole penetrates two sides of the bottom plate. Each of the plurality of fan blades has a blade body and an assembly portion, the assembly portion is connected to the blade body, and the assembly portion is inserted into the lateral slot. The assembly portion has a positioning groove and a first elastic buckle, the positioning groove corresponds to the insertion hole, the first elastic buckle is disposed on a bottom side of the assembly portion, and the first elastic buckle corresponds to the buckle hole. A second elastic buckle is disposed on one side of each of the plurality of tenon assemblies. The assembly portions of the plurality of fan blades are respectively inserted into the lateral slots of the plurality of mounting portions of the blade frame, the first elastic buckles are respectively buckled with the buckle holes, and the plurality of tenon assemblies are respectively inserted into the corresponding insertion holes and the positioning grooves, so that the assembly portions of the plurality of fan blades are respectively mounted on the plurality of mounting portions of the blade frame. The second elastic buckle of each of the plurality of tenon assemblies is engaged with a lower edge of one side of a corresponding one of the insertion holes, and the plurality of tenon assemblies press against the first elastic buckles of the plurality of fan blades, respectively.

Therefore, in the ceiling fan blade quick assembly structure provided by the present disclosure, the assembly portions of the plurality of fan blades are inserted into the lateral slots of the plurality of mounting portions, and the first elastic buckles are respectively buckled with the buckle holes, such that the assembly portions are stopped from exiting out of the lateral slots. Furthermore, the plurality of tenon assemblies are respectively inserted into the corresponding insertion holes and the positioning grooves so as to stably position the fan blades onto the blade frame, and the second elastic buckle of each of the plurality of tenon assemblies is engaged with a lower edge of one side of a corresponding one of the insertion holes so as to prevent the tenon assemblies to be ejected upward. Moreover, the plurality of tenon assemblies press against the first elastic buckles of the plurality of fan blades, respectively, such that the first elastic buckles are more stably buckled with the buckle holes, thereby preventing the assembly portions from exiting the lateral slots. Accordingly, a quick and tool-free assembly can be achieved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
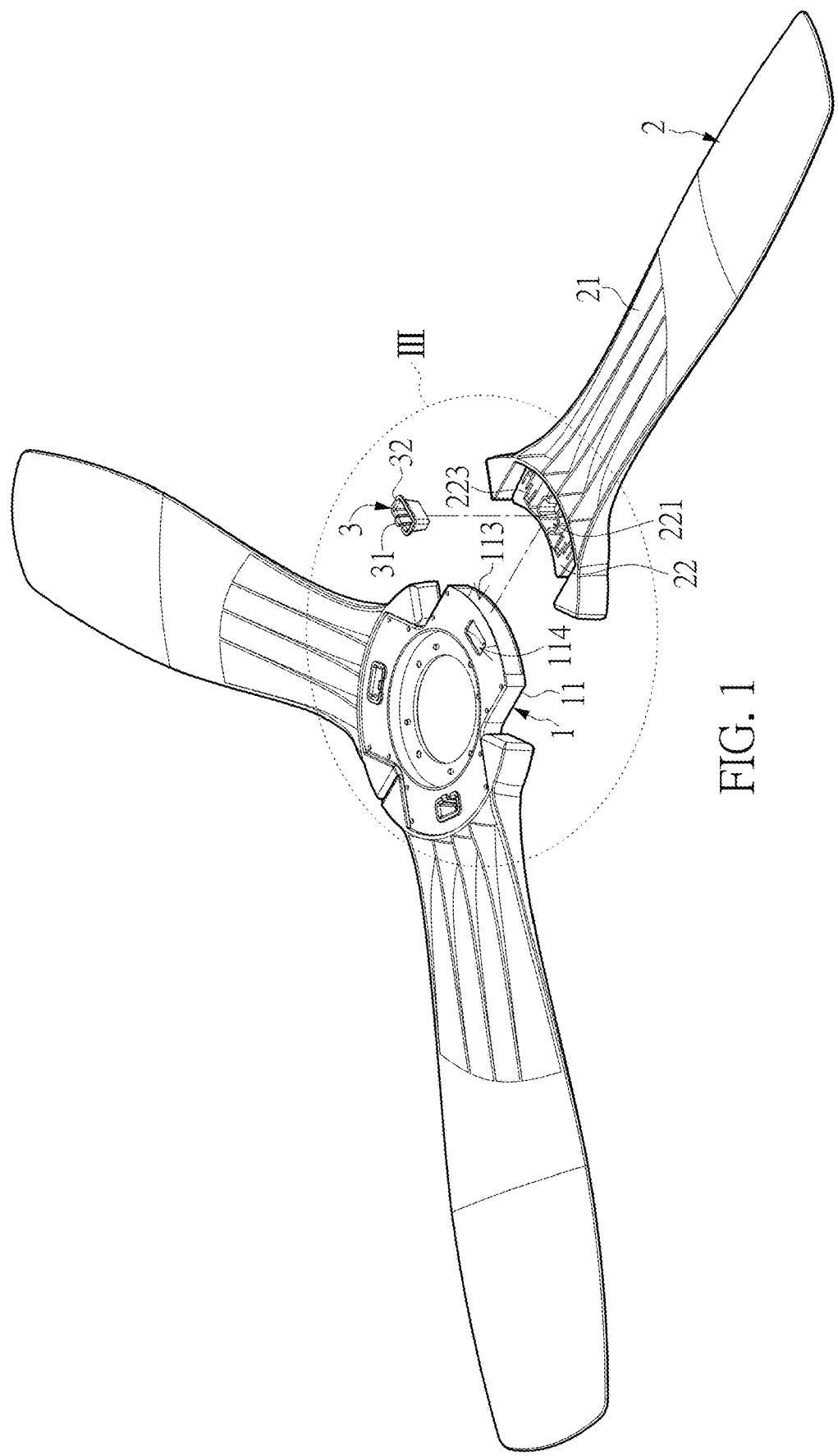
FIG. 1 is a perspective exploded view of a ceiling fan blade quick assembly structure according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

EMBODIMENTS

Figure 2:
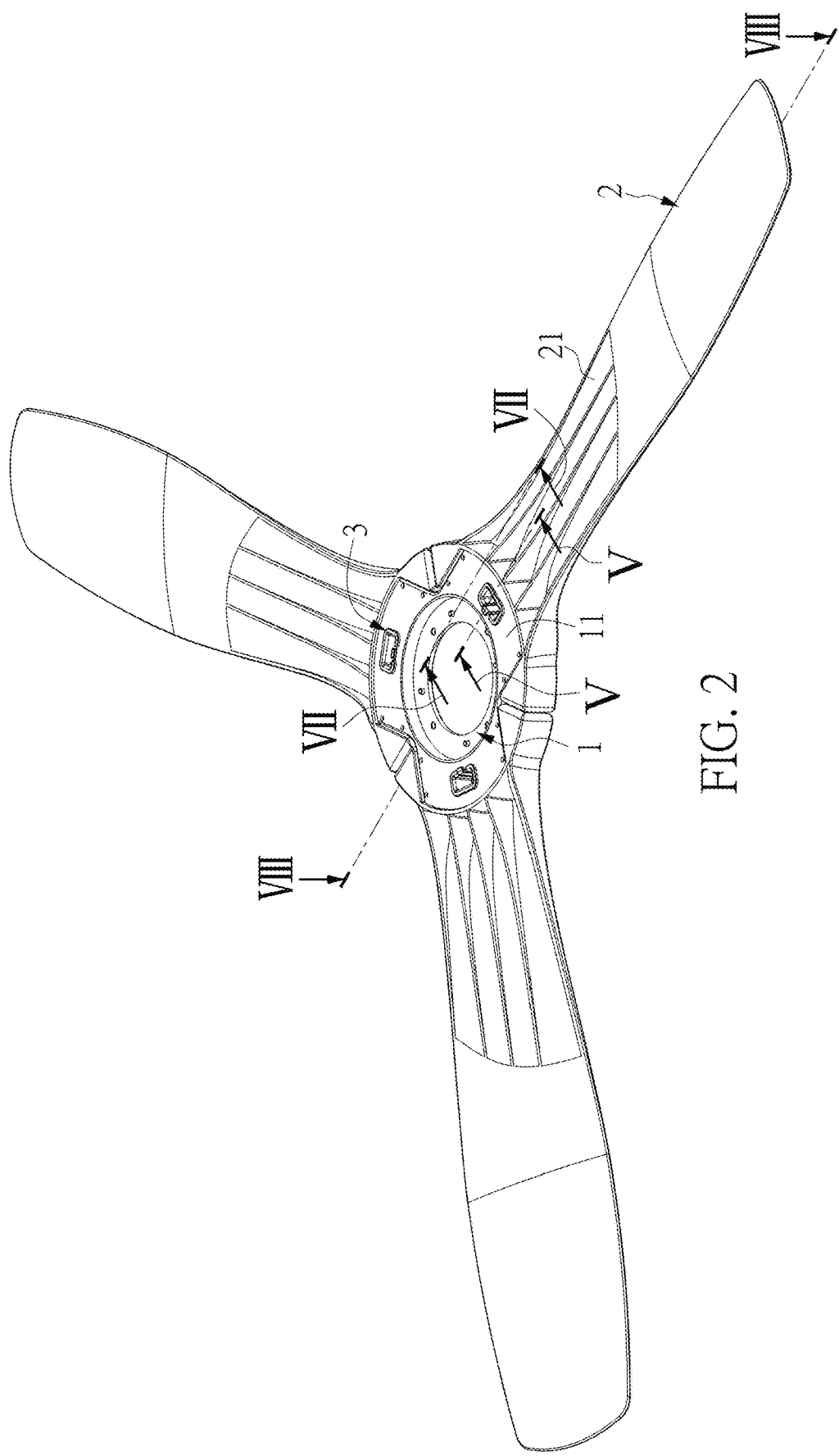
FIG. 2 is a perspective view of the ceiling fan blade quick assembly structure according to one embodiment of the present disclosure.

Referring to FIG. 1 and FIG. 2, the present disclosure provides a ceiling fan blade quick assembly structure that includes a blade frame 1, a plurality of fan blades 2, and a plurality of tenon assemblies 3.

Figure 3:
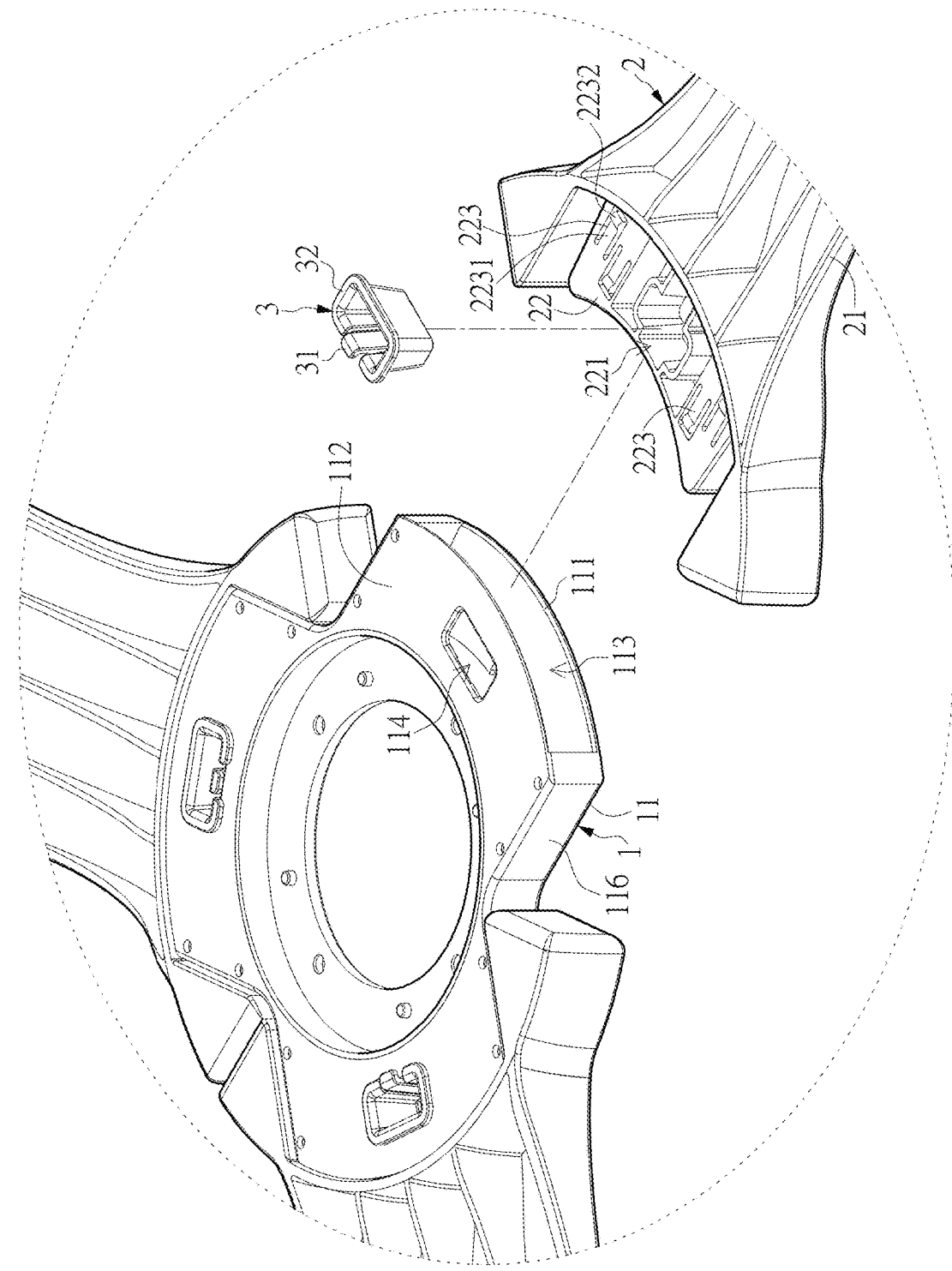
FIG. 3 is a detailed view of part III of FIG. 1.
Figure 4:
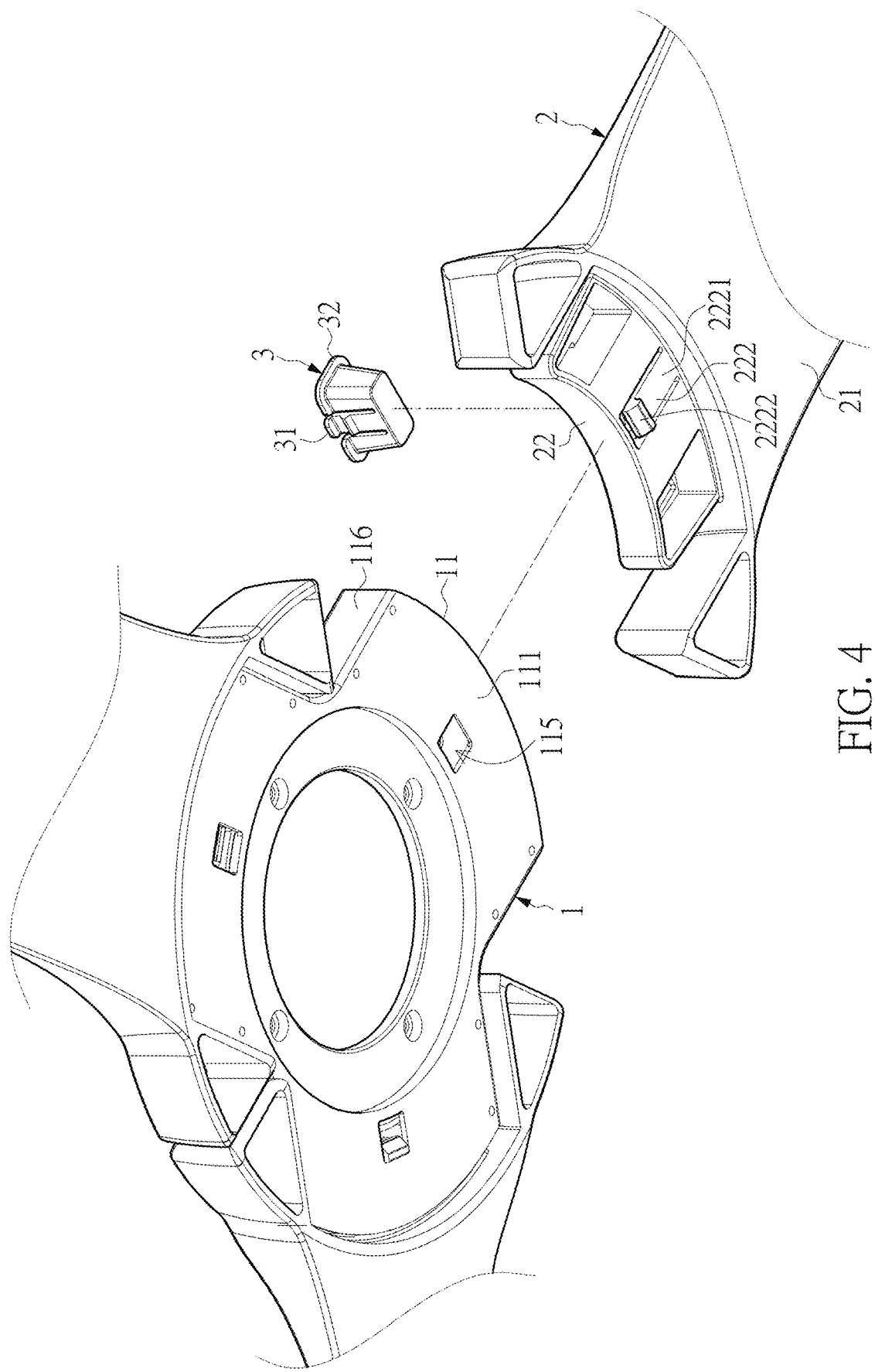
FIG. 4 is another perspective view of FIG. 3.
Figure 5:
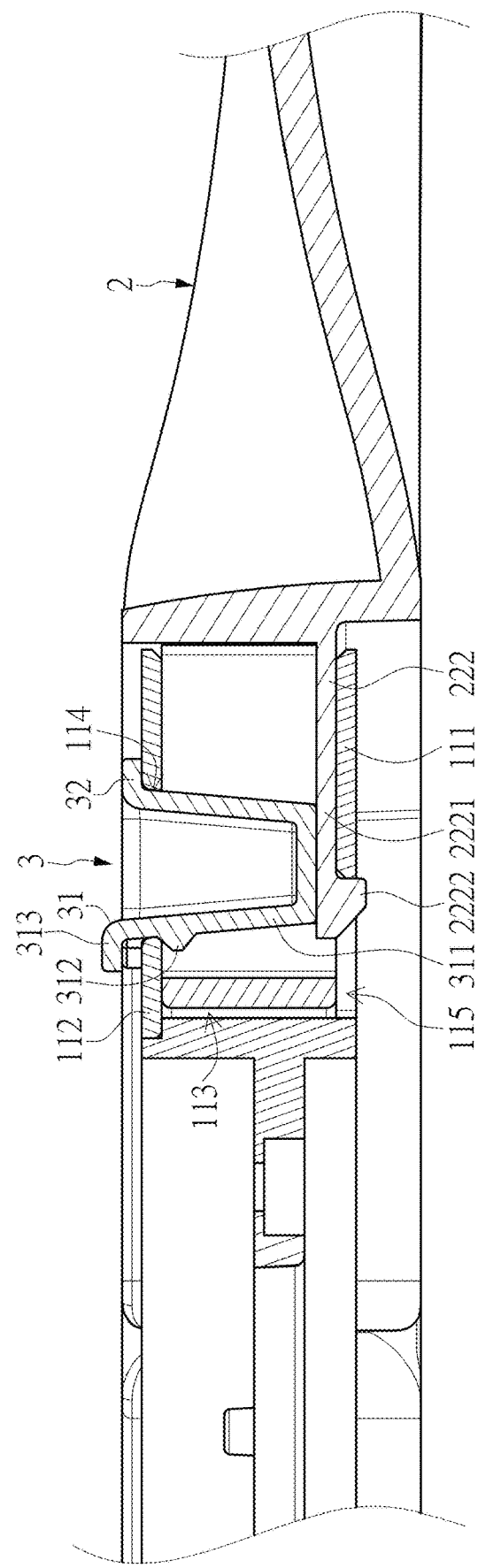
FIG. 5 is a cross-sectional view taken along line V-V of FIG. 2.

The blade frame 1 is fixedly installed on a motor, and the blade frame 1 is substantially in a shape of a circular frame, but the shape of the blade frame 1 is not limited thereto. The blade frame 1 includes a plurality of mounting portions 11, and a quantity of the mounting portions 11 is not limited and can vary according to a quantity of the fan blades 2. Each of the mounting portions 11 includes a bottom plate 111, a top plate 112, and a lateral slot 113 (as shown in FIG. 3 to FIG. 5). The top plate 112 is arranged at an interval above the bottom plate 111, the bottom plate 111 and the top plate 112 can be parallel to each other, and a side plate 116 can be connected between two sides of the bottom plate 111 and two sides of the top plate 112, such that the mounting portion 11 has a frame-shaped structure for having an increased structural strength. The lateral slot 113 is located between the bottom plate 111 and the top plate 112, and the bottom plate 111 and the top plate 112 are respectively located below and above the lateral slot 113. An insertion hole 114 is formed on the top plate 112, the insertion hole 114 may be a square hole, and the insertion hole 114 penetrates two sides of the top plate 112. A buckle hole 115 is formed on the bottom plate 111, the buckle hole 115 can be a square hole, and the buckle hole 115 penetrates two sides of the bottom plate 111. However, shapes of the insertion hole 114 and the buckle hole 115 are not limited thereto.

Each of the plurality of fan blades 2 has a blade body 21 and an assembly portion 22. The assembly portion 22 is connected to the blade body 21; that is, the assembly portion 22 is connected to one end of the blade body 21. The shape of the assembly portion 22 matches with that of the lateral slot 113, such that the assembly portion 22 can be inserted into the lateral slot 113. In this embodiment, the assembly portion 22 is a plate body having a cross-section that is quadrilateral-shaped, and the cross-section of the lateral slot 113 is also quadrilateral-shaped. Therefore, the assembly portion 22 and the lateral slot 113 can be inserted into each other and have a firm connection.

Each of the assembly portions 22 has a positioning groove 221 and a first elastic buckle 222. The positioning groove 221 corresponds to the insertion hole 114. The positioning groove 221 can be a square groove, and the positioning groove 221 can be tapered downward. A top side of the positioning groove 221 is open, such that one of the tenon assemblies 3 can be inserted into the positioning groove 221 from the top side. The first elastic buckle 222 is arranged on a bottom side of the assembly portion 22, and the first elastic buckle 222 corresponds to the buckle hole 115. The first elastic buckle 222 can have a first elastic arm 2221 and a first protrusion 2222, one end of the first elastic arm 2221 is a fixed end, and another end of the first elastic arm 2221 is a movable end. The first protrusion 2222 is located at the movable end of the first elastic arm 2221, and the first elastic buckle 222 can swing in a top-down manner to provide a buckle function, such that the first protrusion 2222 of the first elastic buckle 222 can be buckled with the buckle hole 115.

Figure 7:
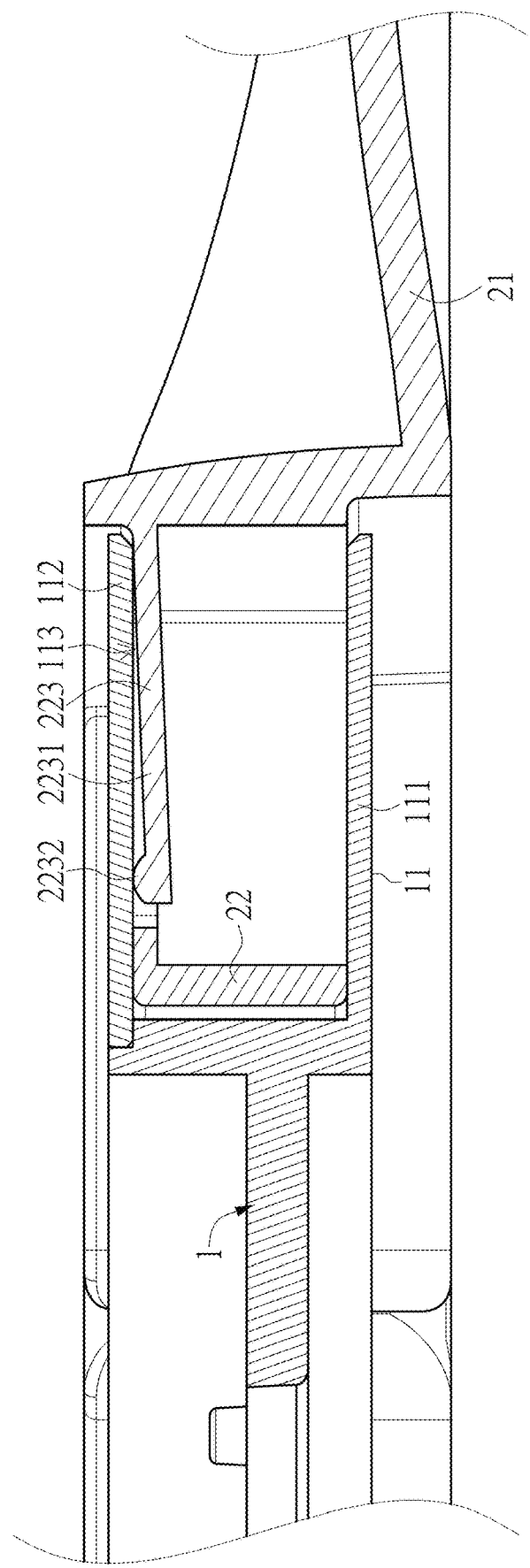
FIG. 7 is a cross-sectional view taken along line VII-VII of FIG. 2.
Figure 8:
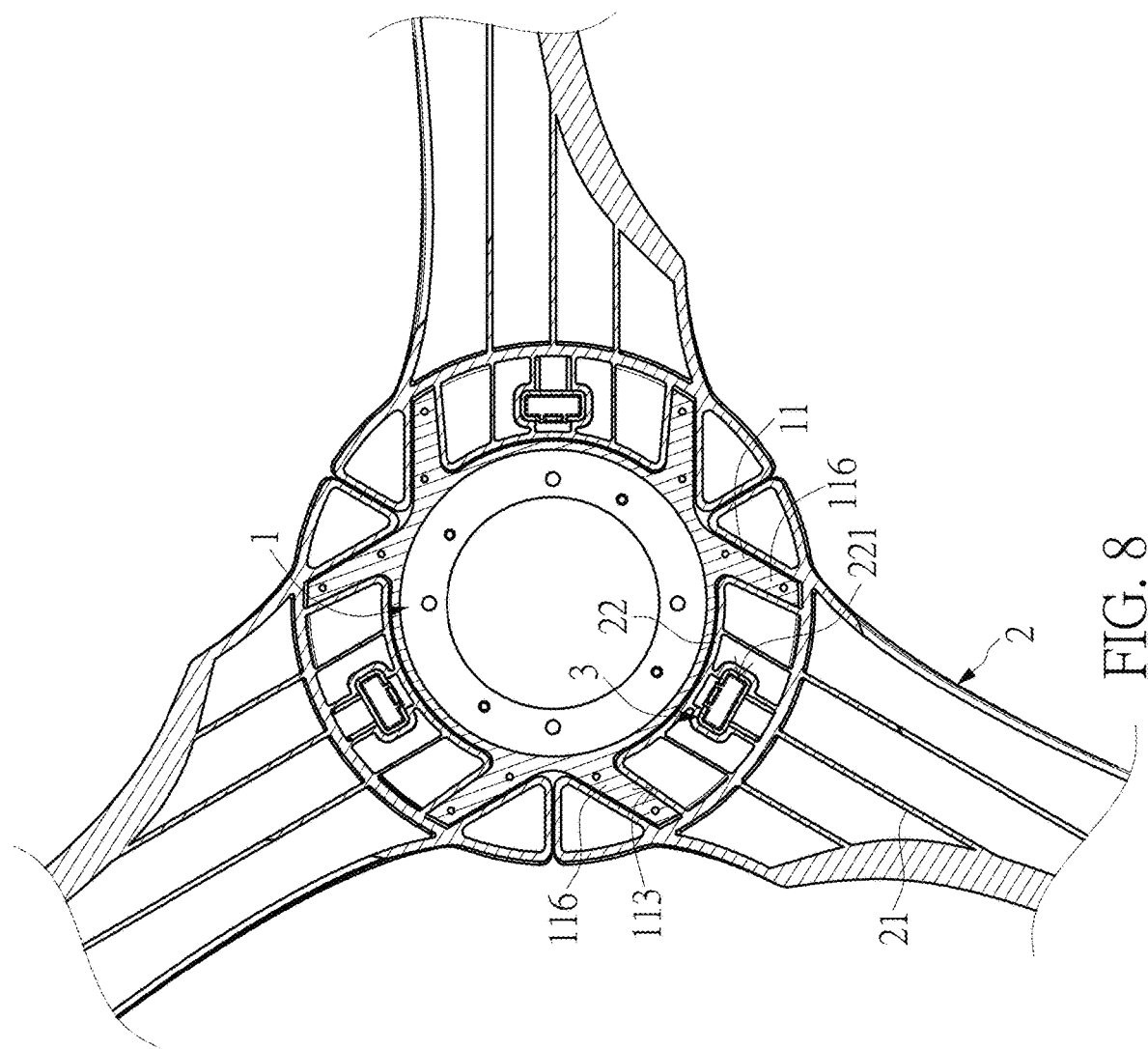
FIG. 8 is a cross-sectional view taken along line VIII-VIII of FIG. 2.

The assembly portions 22 of the plurality of fan blades 2 are respectively inserted into the lateral slots 113 of the mounting portions 11 of the blade frame 1 (as shown in FIG. 7 and FIG. 8). When one of the assembly portions 22 is inserted into the corresponding lateral slot 113, the first elastic buckle 222 can be buckled with the buckle hole 115 to prevent the assembly portion 22 from exiting out of the lateral slot 113, and the positioning groove 221 is aligned with the insertion hole 114 on the top plate 112.

The quantity of the tenon assemblies 3 can be changed according to the quantity of the fan blades 2. Each of the tenon assemblies 3 can be inserted into the insertion hole 114 and the positioning groove 221 when the assembly portion 22 of the fan blade 2 is inserted into the lateral slot 113, such that the assembly portion 22 of the fan blade 2 is stably mounted on the mounting portion 11 of the blade frame 1. In this embodiment, the tenon assemblies 3 can have a square body, and the tenon assemblies 3 can be tapered downward to match with the insertion holes 114 and the positioning grooves 221. Therefore, the tenon assemblies 3 can be smoothly inserted into the insertion holes 114 and the positioning slots 221. The tenon assemblies 3 can press on the first elastic buckle 222 (as shown in FIG. 5), such that the first elastic buckle 222 can be more stably buckled with the buckle hole 115, so as to prevent the assembly portion 22 from exiting out of the lateral slot 113.

Figure 6:
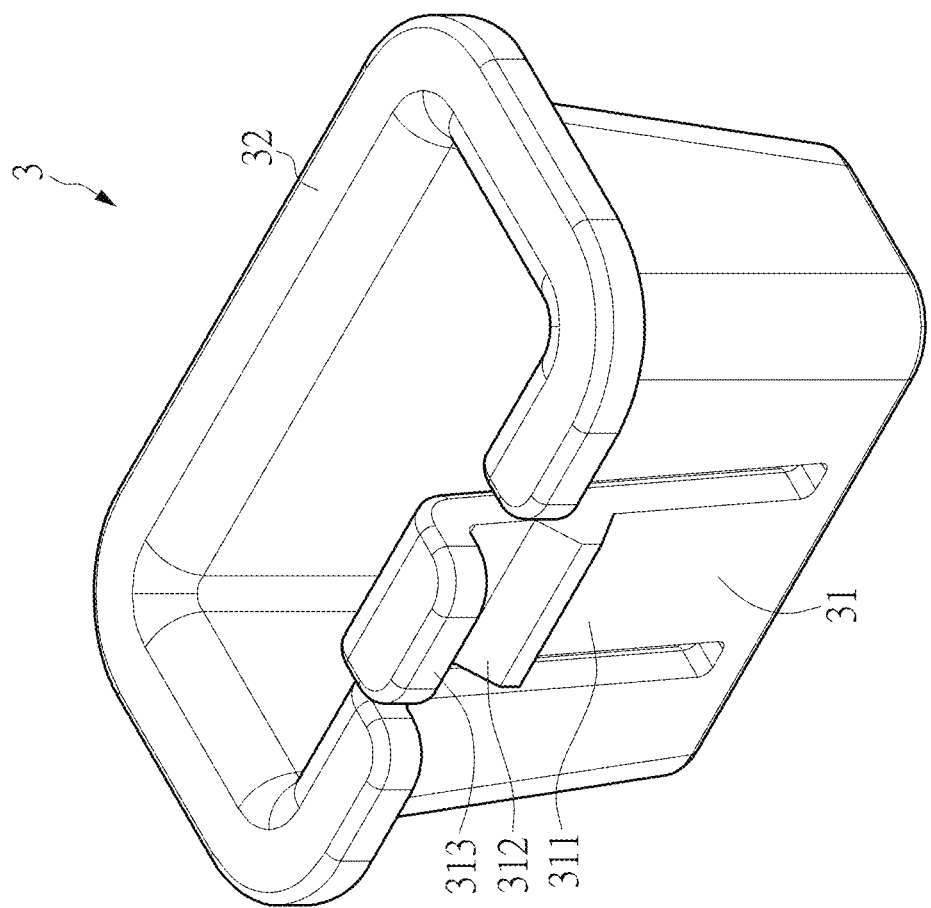
FIG. 6 is a perspective view of a tenon assembly according to one embodiment of the present disclosure.

A second elastic buckle 31 is provided on one side of the tenon assembly 3 (as shown in FIG. 6) for being engaged with a lower edge of one side of the insertion hole 114 when the tenon assembly 3 is inserted into the insertion hole 114 and the positioning groove 221, so as to prevent the tenon assembly 3 from exiting from the positioning groove 221 and the insertion hole 114 and achieve the purpose of tool-free quick installation. The second elastic buckle 31 has a second elastic arm 311, a second protrusion 312, and a pulling tab 313. One end of the second elastic arm 311 is a fixed end, and another end of the second elastic arm 311 is a movable end. The second protrusion 312 is located on the second elastic arm 311, the pulling tab 313 is located on the movable end of the second elastic arm 311, and the second elastic buckle 31 can swing in a front-rear manner. When the tenon assembly 3 is inserted into the insertion hole 114 and the positioning groove 221, the second protrusion 312 engages with the lower edge of one side of the insertion hole 114 to prevent the tenon assembly 3 from exiting from the positioning groove 221 and the insertion hole 114. The pulling tab 313 can be used to pull the second elastic buckle 31 to facilitate the disassembly of the tenon assembly 3.

In this embodiment, an upper end of each of the tenon assemblies 3 further has a flange 32. The flange 32 is arranged at a periphery of the upper end of the tenon assembly 3 and protrudes outward. When the tenon assembly 3 is inserted into the insertion hole 114 and the positioning groove 221, the flange 32 abuts against the top plate 112 of the mounting portion 11 to provide a blocking and positioning function, such that the tenon assembly 3 is positioned stably.

In addition, a plurality of elastic members 223 may be disposed on top or bottom sides of the assembly portion 22 of each of the fan blades 2. Each of the elastic members 223 has a third elastic arm 2231 and a third protrusion 2232. One end of the third elastic arm 2231 is a fixed end, and another end of the third elastic arm 2231 is a movable end. The third protrusion 2232 is located on the movable end of the third elastic arm 2231. The elastic member 223 can swing in a top-down manner to provide an elastic resistance function. When the assembly portion 22 is inserted into the lateral slot 113, the third protrusion 2232 of the elastic member 223 can abut against the top plate 112 or the bottom plate 111 (as shown in FIG. 7) to eliminate gaps between the assembly portion 22 and the lateral slot 113 in upper and lower directions.

Beneficial Effects of the Embodiments

In conclusion, in the ceiling fan blade quick assembly structure provided by the present disclosure, the assembly portions of the plurality of fan blades are inserted into the lateral slots of the plurality of mounting portions, and the first elastic buckles are respectively buckled with the buckle holes, such that the assembly portions are stopped from being ejected out of the lateral slots. Furthermore, the plurality of tenon assemblies are respectively inserted into the corresponding insertion holes and the positioning grooves so as to stably position the fan blades onto the blade frame, and the second elastic buckle of each of the plurality of tenon assemblies is engaged with a lower edge of one side of a corresponding one of the insertion holes so as to prevent the tenon assemblies to be ejected upward. Moreover, the plurality of tenon assemblies press against the first elastic buckles of the plurality of fan blades, respectively, such that the first elastic buckles are more stably buckled with the buckle holes, thereby preventing the assembly portions from being ejected out of the lateral slots. Accordingly, a quick and tool-free assembly can be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A ceiling fan blade quick assembly structure, comprising:
a blade frame including a plurality of mounting portions, wherein each of the plurality of mounting portions includes a bottom plate, a top plate, and a lateral slot, the top plate is arranged at an interval above the bottom plate, and the lateral slot is located between the bottom plate and the top plate; wherein an insertion hole is formed on the top plate, and the insertion hole penetrates two sides of the top plate; wherein a buckle hole is formed on the bottom plate, and the buckle hole penetrates two sides of the bottom plate;
a plurality of fan blades, wherein each of the plurality of fan blades has a blade body and an assembly portion, the assembly portion is connected to the blade body, and the assembly portion is inserted into the lateral slot; wherein the assembly portion has a positioning groove and a first elastic buckle, the positioning groove corresponds to the insertion hole, the first elastic buckle is disposed on a bottom side of the assembly portion, and the first elastic buckle corresponds to the buckle hole; and
a plurality of tenon assemblies, wherein a second elastic buckle is disposed on one side of each of the plurality of tenon assemblies;
wherein the assembly portions of the plurality of fan blades are respectively inserted into the lateral slots of the plurality of mounting portions of the blade frame, the first elastic buckles are respectively buckled with the buckle holes, and the plurality of tenon assemblies are respectively inserted into the corresponding insertion holes and the positioning grooves, so that the assembly portions of the plurality of fan blades are respectively mounted on the plurality of mounting portions of the blade frame; wherein the second elastic buckle of each of the plurality of tenon assemblies is engaged with a lower edge of one side of a corresponding one of the insertion holes, and the plurality of tenon assemblies press against the first elastic buckles of the plurality of fan blades, respectively.

2. The ceiling fan blade quick assembly structure according to claim 1, wherein a side plate is connected between the two sides of the bottom plate and the two sides of the top plate, so that a frame-shaped structure is formed on the mounting portion.

3. The ceiling fan blade quick assembly structure according to claim 1, wherein a side plate is connected between the two sides of the bottom plate and the two sides of the top plate, so that a frame-shaped structure is formed on the mounting portion; wherein a cross-section of the lateral slot is quadrilateral-shaped, and the assembly portion is a plate body having a cross-section that is quadrilateral-shaped.

4. The ceiling fan blade quick assembly structure according to claim 1, wherein an upper end of each of the tenon assemblies has a flange, and the flange is arranged at a periphery of the upper end of the tenon assembly and protrudes outward; wherein, when the tenon assembly is inserted into the corresponding insertion hole and the positioning groove, the flange abuts against the top plate of the mounting portion.

5. The ceiling fan blade quick assembly structure according to claim 1, wherein the first elastic buckle has a first elastic arm and a first protrusion, one end of the first elastic arm is a fixed end, and another end of the first elastic arm is a movable end; wherein the first protrusion is located at the movable end of the first elastic arm, so that the first protrusion of the first elastic buckle is buckled with the buckle hole.

6. The ceiling fan blade quick assembly structure according to claim 1, wherein the second elastic buckle has a second elastic arm, a second protrusion, and a pulling tab, one end of the second elastic arm is a fixed end, and another end of the second elastic arm is a movable end; wherein the second protrusion is located on the second elastic arm, and the pulling tab is located on the movable end of the second elastic arm, so that the second protrusion is engaged with the lower edge of the one side of the corresponding one of the insertion holes.

7. The ceiling fan blade quick assembly structure according to claim 1, wherein a plurality of elastic members are disposed on a top side of the assembly portion of each of the fan blades, and each of the plurality of elastic members has a third elastic arm and a third protrusion; wherein one end of the third elastic arm is a fixed end, and another end of the third elastic arm is a movable end; wherein the third protrusion is located on the movable end of the third elastic arm, so that the third protrusions of the plurality of elastic members abut against the top plate.

\* \* \* \* \*